（12） United States Patent
Huang et al.

(10) Patent No.: US 10,281,288 B2
(45) Date of Patent: May 7, 2019

(54) VEHICLE NAVIGATION DEVICE AND METHOD THEREOF

(71) Applicants: INVENTEC (PUDONG) TECHNOLOGY CORPORATION, Shanghai (CN); INVENTEC CORPORATION, Taipei (TW)

(72) Inventors: Joe-Wen Huang, Taipei (TW); Jia-Chi Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 60 days.

(21) Appl. No.: 15/473,474

(22) Filed: Mar. 29, 2017

(65) Prior Publication Data

US 2018/0120118 A1 May 3, 2018

(30) Foreign Application Priority Data

Oct. 28, 2016 (CN) .......................... 2016 1 0959562

(51) Int. Cl.
*G01C 21/34* (2006.01)
*G01C 21/36* (2006.01)

(52) U.S. Cl.
CPC ..... *G01C 21/3415* (2013.01); *G01C 21/3608* (2013.01); *G01C 21/3647* (2013.01); *G01C 21/3676* (2013.01); *G01C 21/3691* (2013.01); *G01C 21/3697* (2013.01)

(58) Field of Classification Search
CPC ................................................. G01C 21/3415
See application file for complete search history.

(56) References Cited

U.S. PATENT DOCUMENTS

| 7,353,110 | B2* | 4/2008 | Kim ................... | G01C 21/3644 340/995.1 |
| 8,577,601 | B2* | 11/2013 | Li ...................... | G01C 21/3647 701/423 |
| 2007/0118281 | A1* | 5/2007 | Adam ................ | G01C 21/3647 701/431 |
| 2017/0174129 | A1* | 6/2017 | Chin .................. | G01C 21/3647 |

\* cited by examiner

*Primary Examiner* — Hussein Elchanti
*Assistant Examiner* — Michael A Berns
(74) *Attorney, Agent, or Firm* — Maschoff Brennan

(57) ABSTRACT

According to one or more embodiments of this disclosure, the vehicle navigation device includes an image capturing component, a wireless communication component, a positioning component and a processor. The image capturing component is configured to capture an event data image of an external condition of a vehicle. The positioning component is configured to obtain a vehicle position and provide it to the processor. The processor is configured to upload the vehicle position and the event data image via the wireless communication component in response to a uploading instruction, and download driving information, corresponding to the vehicle position and a destination position, via the wireless communication component in response to a downloading instruction, wherein the driving information includes information of at least one driving route and one or more real-time street views corresponding to the at least one driving route.

9 Claims, 2 Drawing Sheets

VEHICLE NAVIGATION DEVICE AND METHOD THEREOF

CROSS-REFERENCE TO RELATED APPLICATIONS

This non-provisional application claims priority under 35 U.S.C. § 119(a) on Patent Application No(s). 201610959562.8 filed in China on Oct. 28, 2016, the entire contents of which are hereby incorporated by reference.

BACKGROUND

Technical Field

This disclosure relates to a navigation device, and particularly to a navigation device having a communication component.

Related Art

A car is the major transportation tool of the contemporary society. Therefore, peripheral products of cars such as a vehicle navigation device and a vehicle event data recorder are widely used. However, these automobile products are mostly single functional and lack of multi-integrated applications at present. Furthermore, the map data in present navigation devices is mainly authorized and provided by existing maps databases, or obtained from open map databases. Presently, the street view images in the existing map databases are mostly outdated. Along with the replacement of stores and the cityscape in a town, the street view images in the databases have differed from the present situation. However, capturing street view images requires extra investment to dispatch street view cars. Moreover, considering the costs and efficiency, the collection of the street views mainly focuses on the downtown areas, leading to the lack of information about rural areas.

SUMMARY

According to one or more embodiments of this disclosure, the vehicle navigation device includes an image capturing component, a wireless communication component, a positioning component and a processor. The processor is connected to the image capturing component, the wireless communication component and the positioning component. The image capturing component is configured to capture an event data image of an external condition of a vehicle. The positioning component is configured to obtain a vehicle position and provide it to the processor. The processor is configured to upload the vehicle position and the event data image via the wireless communication component in response to a uploading instruction, and download driving information, corresponding to the vehicle position and a destination position, via the wireless communication component in response to a downloading instruction, wherein the driving information includes information of at least one driving route and one or more real-time street views corresponding to the at least one driving route.

According to one or more embodiments of this disclosure, the vehicle navigation method includes the following steps: uploading a position of a vehicle and an event data image in response to a uploading instruction; and downloading driving information, corresponding to the vehicle position and a destination position, via the wireless communication component in response to a downloading instruction; wherein the driving information includes information of at least one driving route and one or more real-time street views corresponding to the at least one driving route.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
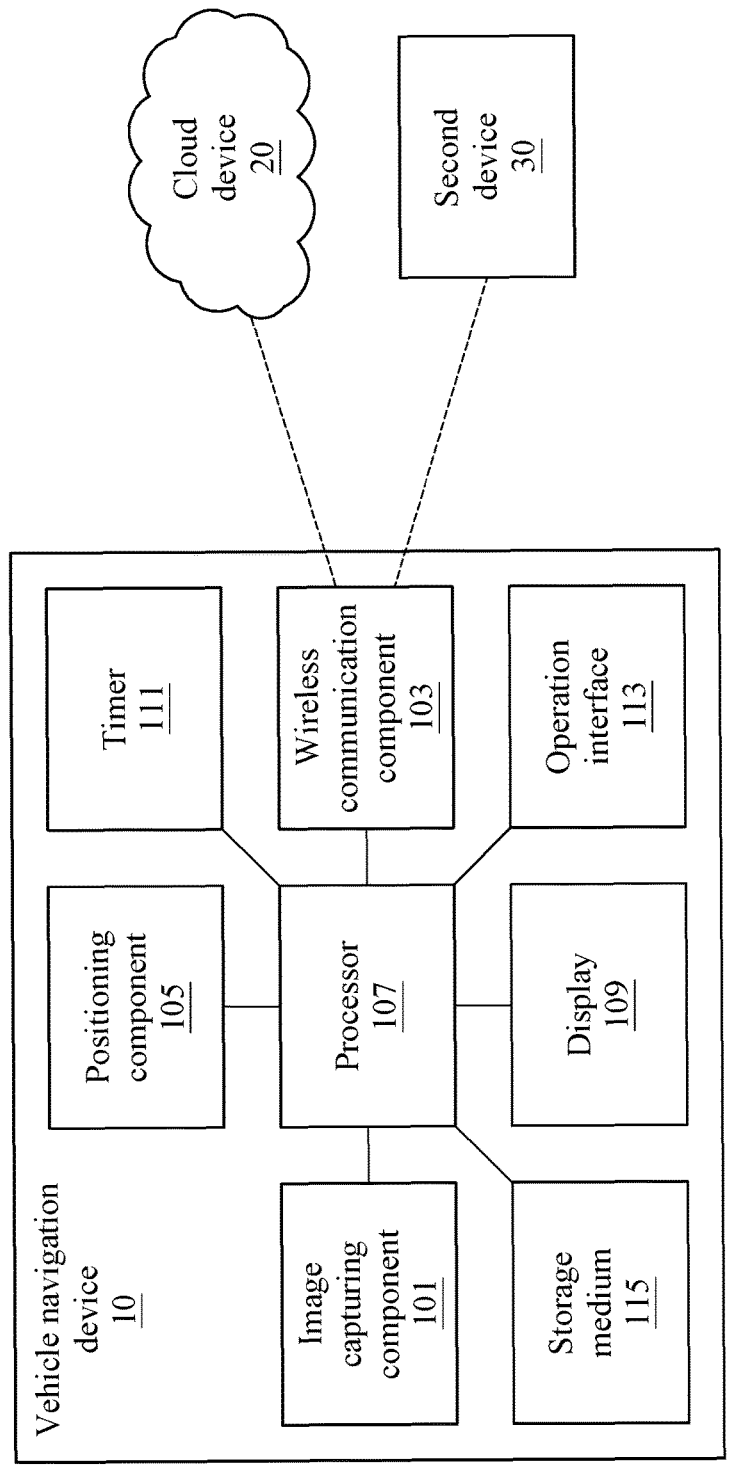
FIG. 1 is a functional block diagram of a vehicle navigation device in an embodiment of this disclosure.

Please refer to FIG. 1, which is a functional block diagram of a vehicle navigation device in an embodiment of this disclosure. In an embodiment, the vehicle navigation device 10 includes an image capturing component 101, a wireless communication component 103, a positioning component 105 and a processor 107. The processor 107 is electrically connected to the image capturing component 101, the wireless communication component 103 and the positioning component 105.

For example, the image capturing component 101 is a camera and is configured to capture an event data image of an external condition of a vehicle. This disclosure does not intend to limit the kind of the vehicle. The following explains a usage situation in which the vehicle navigation device 10 is installed in a car. The external condition of the vehicle is, for example, the condition of the street through which the vehicle passes or other vehicle around it. The event data image can be a monochrome or color image, and can be a video continuously captured, or be a picture or photo periodically captured. This disclosure does not intend to limit the form and the capturing method of the event data image. The wireless communication component 103 performs data transmission with the cloud device 20 or the second device 30 via, for example, Wi-Fi, the third generation of wireless mobile telecommunications technology (3G), the fourth generation of wireless mobile telecommunications technology (4G) or other wireless transmission methods. The second device 30 can be a cell phone, a tablet computer, a computer or other device of a user, which is not limited in this disclosure.

The positioning component 105 is configured to obtain the vehicle position. More specifically, the positioning component 105 obtains the geographic position of the vehicle by detecting the signal from, for example, a global positioning system (GPS), a Wi-Fi router or a base station of 3G/4G network. The geographic position can be indicated by coordinates of the vehicle, a city, a famous scenic spot or other indication defined by the user; that is not limited in this disclosure.

The processor 107 uploads the vehicle position and the event data image via the wireless communication component 103 in response to an uploading instruction. The vehicle position is obtained by the positioning component 105, and the event data image is captured by the image capturing component 101. In addition, the processor 107 further downloads driving information, corresponding to the vehicle position and a destination position, via the wireless communication component 103 in response to a downloading instruction. The driving information includes information of at least one driving route and at least one real-time street view corresponding to the driving route. In an embodiment, the processor 107 further downloads surrounding information, corresponding to the vehicle position or the destination position, via the wireless communication component 103. For example, the surrounding information indicates stores and/or parking lots around the destination position or the vehicle position and/or the weather or road condition at the destination position or the vehicle position. In an embodiment, the processor 107 calculates the driving speed or the driving direction of the vehicle according to the vehicle position obtained by the positioning component 105. When the driving speed or the driving direction changes, the processor 107 generates the uploading instruction, and uploads the vehicle position and the event data image via the wireless communication component 103. The processor 107 is, for example, a central processing unit (CPU), a microcontroller unit (MCU), a field programmable gate array (FPGA), an application specific integrated circuit (ASIC) or other processor.

In an embodiment, the vehicle navigation device 10 further includes a display 109 electrically connected to the processor 107. The display 109 is configured to display the driving route, the real-time street view or the surrounding information. For example, the display 109 is a direct-view display, such as a liquid-crystal display (LCD), or a project-type display, such as a projector that projects the information on the windshield of the vehicle. Besides the above examples, the display 109 can also be other types of display, which is not limited in this disclosure.

In an embodiment, the vehicle navigation device 10 further includes a timer 111 which is electrically connected to the processor 107 and periodically generates the uploading instruction. In another embodiment, the timer 111 is capable of periodically generating the downloading instruction. The time interval of generating the uploading instruction is preset or set by the user and the time interval of generating the downloading instruction is preset or set by the user.

In an embodiment, the vehicle navigation device 10 further includes an operation interface 113 which is electrically connected to the processor 107 and configured to set the destination position or other parameters, such as the aforementioned time interval of the timer 111, generate the uploading instruction and/or generate the downloading instruction. More specifically, the operation interface 113 is provided for the user to operate the vehicle navigation device 10. The operation interface 113 can be a physical keyboard, a touch screen, a speech recognition system or other type of human-machine interfaces, which is not limited in this disclosure. In an embodiment, when the user sets or changes the destination position via the operation interface 113, the operation interface 113 generates the downloading instruction and the processor 107 is triggered to download the driving information, corresponding to the vehicle position and the destination position, via the wireless communication component 103. In an embodiment, the operation interface 113 includes a trigger, such as a button. When the user triggers the button, the uploading instruction and/or the downloading instruction is generated by the operation interface 113. In an embodiment, the user can set the time interval of the timer 111 via the operation interface 113.

In an embodiment, the vehicle navigation device 10 further includes a storage medium 115 which is configured to store the downloaded driving information and/or surrounding information. The storage medium 115 can be a flash memory, read-only memory (ROM), magnetoresistive random-access memory (MRAM) or other non-volatile storage medium.

The aforementioned display, timer and operation interface are the components selectively included in the vehicle navigation device 10. In other words, the vehicle navigation device 10 may not include the display, the timer and/or the operation interface.

Figure 2:
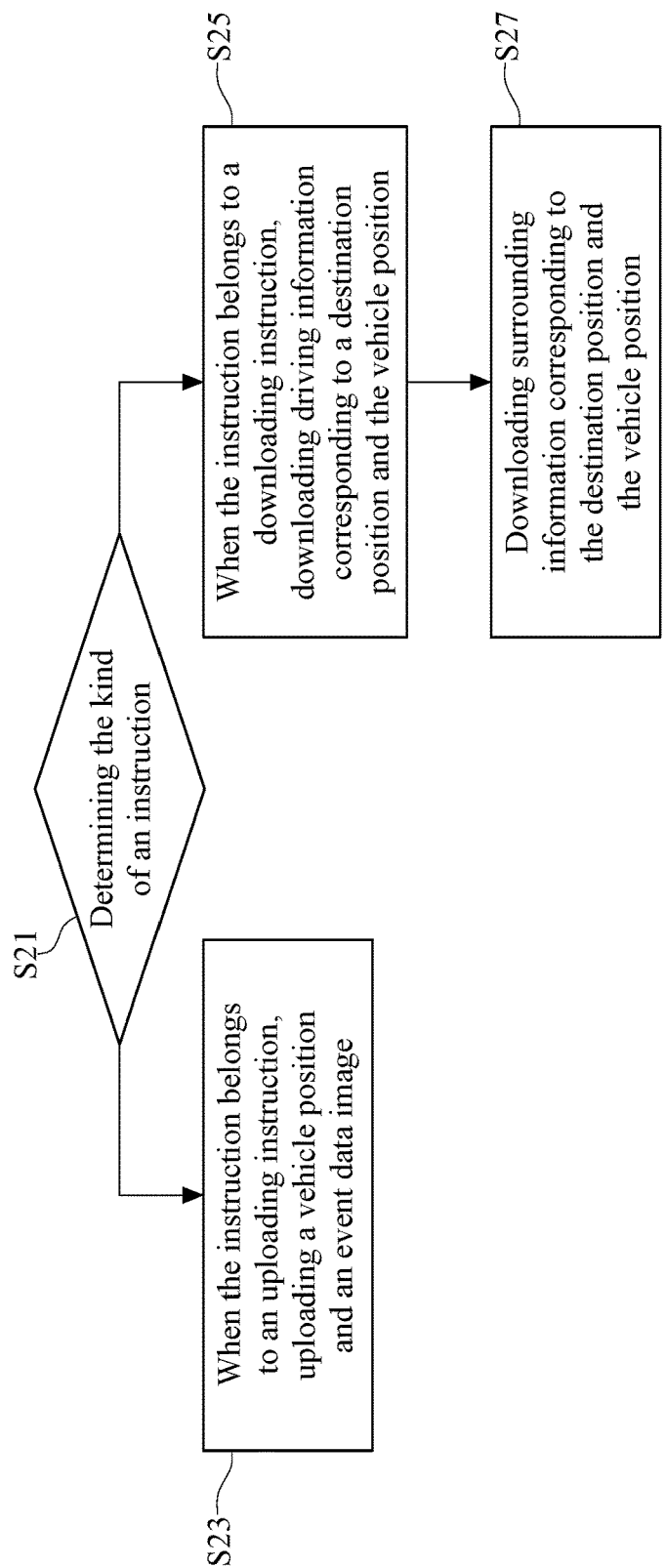
FIG. 2 is a flowchart of a method for vehicle navigation in an embodiment of this disclosure.

Please refer to FIG. 1 and FIG. 2. FIG. 2 is a flowchart of a method for vehicle navigation in an embodiment of this disclosure. As shown in FIG. 1 and FIG. 2, in step S21, the processor 107 determines the kind of the received instruction. When the received instruction belongs to the uploading instruction, step S23 is performed. In step S23, the processor 107 uploads the vehicle position and the event data image, via the wireless communication component 103, to the cloud device 20 or the second device 30 in response to the uploading instruction. As a practical example, when the processor 107 of the vehicle navigation device 10 receives an instruction and determines it belongs to the uploading instruction as a user drives in New York City, the processor 107 uploads the vehicle position "New York City" and an event data image, via the wireless communication component 103, to the cloud device 20, wherein the event data image is captured by the image capturing component 101 when the upload instruction is received.

On the other hand, as step S25, when the received instruction belongs to the downloading instruction, the processor 107 downloads the driving information corresponding to the vehicle position and the destination position, via the wireless communication component 103, from the cloud device 20 or the second device 30 in response to the downloading instruction. The driving information includes information of at least one driving route and one or more real-time street views corresponding to the driving route. The destination position indicates the place where the user expects to go. In an embodiment, the user is able to set the destination position via the operation interface 113. The destination position can be input by the keyboard, mouse, touch screen or speech recognition system. In addition, one or more frequently-used locations can also be preset, stored and displayed as buttons, and then the destination position can be set by selecting the button; and other methods can also be utilized to set the destination position. This disclosure does not intend to limit the setting method of the destination position. The driving route indicates a planning route from the vehicle position to the destination position, wherein the vehicle position indicates the recent location of the vehicle. In an embodiment, the processor 107 downloads the information of the driving route and the real-time street view via the wireless communication component 103. The aforementioned driving route and real-time street view are provided for the user via the display 109.

In an embodiment, the number of downloaded driving routes is more than one, and the user is able to select one of the driving routes via the operation interface 113. In an embodiment, the screen of the display 109 displays a peripheral map of the location of the user. The driving route is shown in the map displayed by the display 109. The map is authorized by the present map database, such as Google Map or other open map database. Moreover, in an embodiment, a pre-stored map is stored in the storage medium. When the wireless communication component 103 cannot be connected to the cloud device 20 or the second device 30, the processor 107 is able to generate the driving route according to the vehicle position, the destination position and the pre-stored map. In an embodiment, the downloaded real-time street view corresponds to the vehicle position wherein the number of downloaded real-time street views can be one or more. In an embodiment, the real-time street view is accessed from the authorized present map database. In another embodiment, the real-time street view is obtained by processing the event data image, which is provided by other user, in the cloud device 20.

In an embodiment, in step S27, the processor 107 downloads the surrounding information corresponding to the destination position or the vehicle position, via the wireless communication component 103, from the cloud device 20 or the second device 30. In an embodiment, the surrounding information indicates the information of stores and/or parking lots nearby the destination position and/or the vehicle position. More specifically, the processor 107 is able to download service information of the stores or parking lots from the cloud device 20. For example, the service information indicates discount information of products or the number of remaining parking spaces in the parking lot. In another embodiment, the surrounding information indicates the weather condition and/or the road condition of the destination position and/or the vehicle position. More specifically, for example, the processor 107 is able to download the weather condition provided by the National Weather Service and/or the road condition provided by the Federal Highway Administration, via the cloud device 20. In yet another embodiment, the surrounding information indicates personal information related to the destination position and/or the vehicle position. More specifically, the personal information is, for example, a maintenance record, a refuel record or other information of the vehicle. In addition, in an embodiment, the downloaded surrounding information can be shown via the display 109. As a practical example, a user is able to know not only a promotion activity at a nearby shopping mall but also the number of remaining parking spaces in the nearby parking lot via the display 109 during driving. Moreover, when the user plans to drive to a desired spot, he/she is able to learn of the weather and road conditions of the famous spot via the display 109.

In an embodiment of this disclosure, the vehicle navigation device is able to download the information, which is uploaded by other vehicle navigation device, from the cloud device. In other words, a number of vehicle navigation devices respectively upload the vehicle positions and the event data images to the cloud device, and the cloud device is able to classify, store and/or calculate the vehicle positions and the event data images so that the vehicle navigation device is able to download the information of the driving route and the real-time street view corresponding to the present vehicle position. Therefore, each vehicle navigation device is considered to be a street view car to provide the street view images that the present map databases lack of, or update the street view images in the present map databases so that the costs of dispatching street view cars may be decreased.

In view of the above description, the vehicle navigation device and the method thereof upload the vehicle position and the event data image to the cloud device or the second device, and download driving information, including the driving route and the real-time street view, and further the personal information from the cloud device or the second device, according to the vehicle position.

What is claimed is:
1. A vehicle navigation device, comprising:
   an image capturing component configured to capture an event data image of an external condition of a vehicle;
   a wireless communication component;
   a positioning component configured to obtain a vehicle position; and
   a processor connected to the image capturing component, the wireless communication component and the positioning component, and configured to upload the vehicle position and the event data image via the wireless communication component to a cloud device in response to a uploading instruction, and download driving information, corresponding to the vehicle position and a destination position, via the wireless communication component in response to a downloading instruction, wherein the driving information comprises information of at least one driving route and one or more real-time street views corresponding to the at least one driving route,
   wherein the processor calculates a driving speed or a driving direction according to the vehicle position, and generates the uploading instruction when the driving speed or the driving direction changes.
2. The vehicle navigation device according to claim 1, further comprising:
   a display connected to the processor, and configured to display the at least one driving route and the one or more real-time street views corresponding to the at least one driving route.
3. The vehicle navigation device according to claim 1, further comprising:
   a timer connected to the processor, and configured to periodically generate the uploading instruction and/or periodically generate the downloading instruction.
4. The vehicle navigation device according to claim 1, further comprising:
   an operation interface configured to set the destination position and generate the uploading instruction or the downloading instruction.
5. The vehicle navigation device according to claim 1, wherein the processor downloads at least one piece of surrounding information via the wireless communication component according to the vehicle position or the destination position.
6. A vehicle navigation method, comprising:
   uploading, using a vehicle navigation device, a position of a vehicle and an event data image, captured by an image capturing device of the vehicle navigation device, to a cloud device in response to an uploading instruction;
   downloading driving information, corresponding to a vehicle position and a destination position, via a wireless communication component in response to a downloading instruction;
   calculating a driving speed or a driving direction according to the vehicle position; and
   generating the uploading instruction when the driving speed or the driving direction changes,
   wherein the driving information comprises information of at least one driving route and one or more real-time street views corresponding to the at least one driving route.

7. The vehicle navigation method according to claim 6, further comprising periodically generating the uploading instruction.

8. The vehicle navigation method according to claim 6, further comprising periodically generating the downloading instruction and/or generating the downloading instruction when the destination position changes.

9. The vehicle navigation method according to claim 6, further comprising downloading at least one piece of surrounding information corresponding to the vehicle position or the destination position in response to the downloading instruction.

\* \* \* \* \*